United States Patent
Lee et al.

(10) Patent No.: US 8,180,932 B2
(45) Date of Patent: May 15, 2012

(54) SIGNAL RECEIVING METHOD FOR DETERMINING TRANSMISSION FORMAT OF INPUT SIGNAL AND RELATED SIGNAL RECEIVING CIRCUIT

(75) Inventors: An-Ming Lee, Hsin-Chu Hsien (TW);
Tzu-Chien Tzeng, Hsin-Chu (TW);
Yu-Pin Chou, Miao-Li Hsien (TW);
Tzuo-Bo Lin, Taipei (TW)

(73) Assignee: Realtek Semiconductor Corp., Science Park, HsinChu (TW)

( * ) Notice: Subject to any disclaimer, the term of this patent is extended or adjusted under 35 U.S.C. 154(b) by 1028 days.

(21) Appl. No.: 12/125,075

(22) Filed: May 22, 2008

(65) Prior Publication Data
US 2008/0298504 A1    Dec. 4, 2008

(30) Foreign Application Priority Data

May 28, 2007   (TW) ............................... 96118996 A

(51) Int. Cl.
*G06F 3/00*   (2006.01)
(52) U.S. Cl. ........................................................ 710/15
(58) Field of Classification Search ................... 710/15
See application file for complete search history.

(56) References Cited

U.S. PATENT DOCUMENTS

| | | | |
|---|---|---|---|
| 6,292,493 B1 * | 9/2001 | Campbell et al. | 370/445 |
| 6,314,113 B1 * | 11/2001 | Guemas | 370/480 |
| 7,639,817 B2 * | 12/2009 | You et al. | 380/270 |
| 2002/0061012 A1 * | 5/2002 | Thi et al. | 370/352 |
| 2003/0147422 A1 * | 8/2003 | You et al. | 370/468 |
| 2006/0251191 A1 * | 11/2006 | Willenegger | 375/341 |
| 2007/0115951 A1 * | 5/2007 | Karaoguz et al. | 370/356 |

* cited by examiner

*Primary Examiner* — Chun-Kuan Lee
*Assistant Examiner* — Ronald Modo
(74) *Attorney, Agent, or Firm* — Winston Hsu; Scott Margo

(57) ABSTRACT

The present invention discloses a signal receiving method for determining a transmission format of an input signal and a related signal receiving circuit. The signal receiving method includes: receiving the input signal; generating a signal detecting result corresponding to at least a signal transmission channel of a plurality of signal transmission channels according to an output result of the signal transmission channel; and determining the transmission format of the input signal according to the signal detecting result. The signal receiving circuit includes: an input interface, for receiving an input signal; a detecting module, for generating a signal detecting result corresponding to at least a signal transmission channel of a plurality of signal transmission channels according to an output result of the signal transmission channel; and a determining unit, for determining the transmission format of the input signal according to the signal detecting result.

28 Claims, 16 Drawing Sheets

| Pin number | Signal name |
|---|---|
| 1 | TMDS Data2+ |
| 2 | TMDS Data2+ Shield |
| 3 | TMDS Data2- |
| 4 | TMDS Data1+ |
| 5 | TMDS Data1+ Shield |
| 6 | TMDS Data1- |
| 7 | TMDS Data0+ |
| 8 | TMDS Data0+ Shield |
| 9 | TMDS Data0- |
| 10 | TMDS Clock+ |
| 11 | TMDS Clock Shield |
| 12 | TMDS Clock- |
| 13 | CEC |
| 14 | Reserved (in cable but N.C. on device) |
| 15 | SCL |
| 16 | SDA |
| 17 | DDC/CEC Ground |
| 18 | +5V Power |
| 19 | Hot Plug Detect |

FIG. 1 PRIOR ART

| Pin number | Pin definition |
|---|---|
| 1 | ML_Lane 3(n) |
| 2 | GND |
| 3 | ML_Lane 3(p) |
| 4 | ML_Lane 2(n) |
| 5 | GND |
| 6 | ML_Lane 2(p) |
| 7 | ML_Lane 1(n) |
| 8 | GND |
| 9 | ML_Lane 1(p) |
| 10 | ML_Lane 0(n) |
| 11 | GND |
| 12 | ML_Lane 0(p) |
| 13 | GND |
| 14 | GND |
| 15 | AUX_CH(p) |
| 16 | GND |
| 17 | AUX_CH(n) |
| 18 | Hot Plug Detect |
| 19 | Return DP_PWR |
| 20 | DP_PWR |

FIG. 2

SIGNAL RECEIVING METHOD FOR DETERMINING TRANSMISSION FORMAT OF INPUT SIGNAL AND RELATED SIGNAL RECEIVING CIRCUIT

BACKGROUND OF THE INVENTION

1. Field of the Invention

The present invention relates to a method and circuit for receiving signals, and more particularly, to a signal receiving method for determining a transmission format of an input signal and a related signal receiving circuit.

2. Description of the Prior Art

In general, signal transmission formats of transmission interfaces in modern digital video players are mainly high-speed video signal transmission formats such as the high-definition multimedia interface (HDMI) transmission format and Display Port interface transmission format. If it is required to support multiple signal transmission formats of digital transmission interfaces mentioned above in the same integrated circuit (IC), the prior art has to implement a plurality of sets of specific pins respectively corresponding to each of the digital transmission interfaces, or provide a plurality of sets of hardware to individually process input signals of the different digital transmission interfaces. Thus, there will be disadvantages of increasing the number of pins and the IC area for the prior art. It is obvious that the conventional signal receiving circuit is not capable of determining transmission formats of the input signals correctly.

However, both of the high-speed digital video signal transmission formats mentioned above use a differential signal transmission technology of differential pairs to attain purposes of transmitting the digital video signals in high speed. Please refer to FIG. 1 and FIG. 2 together. FIG. 1 shows a pin definition table of the HDMI in accordance with the prior art. FIG. 2 shows a pin definition table of the Display Port interface in accordance with the prior art. As shown in FIG. 1 and FIG. 2, the HDMI uses the pins number 1, 3, 4, 6, 7, 9, 10, 12 to transmit the digital video signals in high speed, and the Display Port interface uses the pins of number 1, 3, 4, 6, 7, 9, 10, 12 to transmit the digital video signals in high speed. In other words, the two high-speed digital video signal transmission formats use four differential pair pins as main input terminals for transmitting the digital video data thereof. In addition, since the specification documents of the HDMI and the Display Port interface are known in the related field, they can be referred for the related descriptions about the pins shown in FIG. 1 and FIG. 2, and thus further explanation of the details about the pins are omitted herein for the sake of brevity.

Since there are some differences and different characteristics between the HDMI and the Display Port interface, thus how to properly use the differences and the different characteristics between the HDMI and the Display Port interface so as to let a signal receiving circuit having the input interface including a plurality of common input terminals corresponding to the different transmission formats be able to correctly determine a transmission format of an input signal is the key point that the present invention is about to disclose.

SUMMARY OF THE INVENTION

It is therefore one of the objectives of the present invention to provide a signal receiving method for determining a transmission format of an input signal and a related signal receiving circuit, so as to solve the problem mentioned above.

In accordance with an embodiment of the present invention, a signal receiving method for determining a transmission format of an input signal is disclosed. The signal receiving method includes: receiving the input signal; generating a signal detecting result corresponding to at least a signal transmission channel of a plurality of signal transmission channels according to an output result of the signal transmission channel; and determining the transmission format of the input signal according to the signal detecting result.

In accordance with an embodiment of the present invention, a signal receiving method for determining a transmission format of an input signal is disclosed. The signal receiving circuit includes an input interface, a detecting module, and a determining unit, wherein the input interface is utilized for receiving the input signal; the detecting module is coupled to the input interface and utilized for generating a signal detecting result corresponding to at least a signal transmission channel of a plurality of signal transmission channels according to an output result of the signal transmission channel; and the determining unit is coupled to the detecting module and utilized for determining the transmission format of the input signal according to the signal detecting result.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 1 shows a pin definition table of the HDMI in accordance with the prior art.

FIG. 2 shows a pin definition table of the Display Port interface in accordance with the prior art.

DETAILED DESCRIPTION

Certain terms are used throughout the following description and the claims to refer to particular system components. As one skilled in the art will appreciate, manufacturers may refer to a component by different names. This document does not intend to distinguish between components that differ in name but not differ in functionality. In the following discussion and in the claims, the terms "include", "including", "comprise", and "comprising" are used in an open-ended fashion, and thus should be interpreted to mean "including, but not limited to . . . " The terms "couple" and "coupled" are intended to mean either an indirect or a direct electrical connection. Thus, if a first device couples to a second device, that connection may be through a direct electrical connection, or through an indirect electrical connection via other devices and connections.

Figure 3:
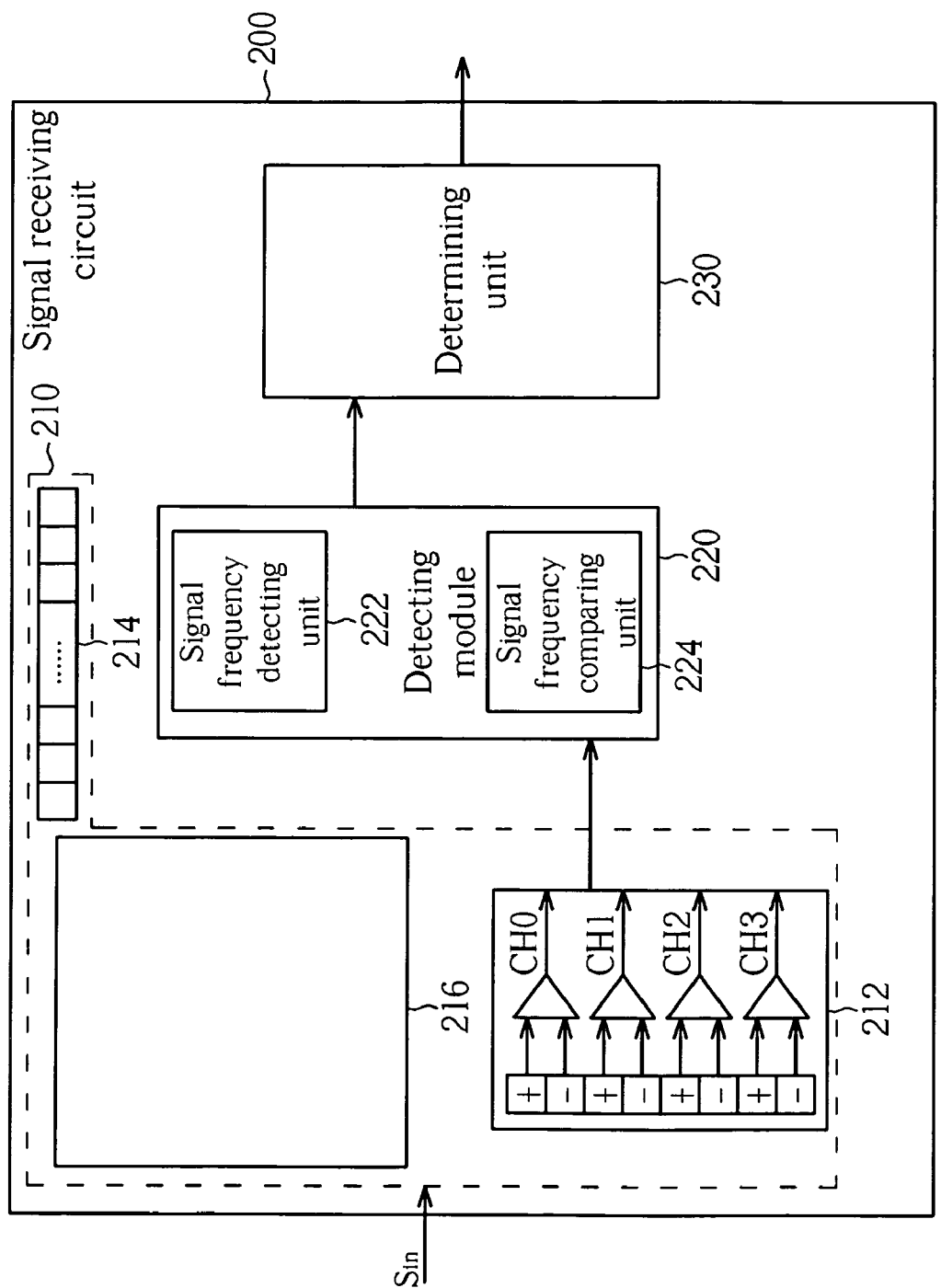
FIG. 3 shows a simplified block diagram of a signal receiving circuit in accordance with a first embodiment of the present invention.

Please refer to FIG. 3. FIG. 3 shows a simplified block diagram of a signal receiving circuit 200 in accordance with a first embodiment of the present invention. As shown in FIG. 3, the signal receiving circuit 200 includes an input interface 210, a detecting module 220, and a determining unit 230, wherein the input interface 210 is utilized for receiving an input signal Sin. Please note that the input signal Sin can be a signal corresponding to a high-definition multimedia interface (HDMI) transmission format or a signal corresponding to a Display Port interface transmission format in this embodiment. However, these signal transmission formats are only for illustration purposes and are not meant to be limitations of the present invention. In addition, the input interface 210 includes a set of common input terminals 212, a first set of specific input terminals 214, and a second set of specific input terminals 216, wherein the first set of specific input terminals 214 and the set of common input terminals 212 are utilized for receiving the input signal Sin corresponding to the HDMI transmission format, and the second set of specific input terminals 216 and the set of common input terminals 212 are utilized for receiving the input signal Sin corresponding to the Display Port interface transmission format. In addition, it is known from the prior art that both the above two transmission interfaces use four sets of differential pair pins as main input terminals for transmitting video and audio data thereof, and thus the set of common input terminals 212 has four signal transmission channels CH0, CH1, CH2, and CH3 in all. Please note that there are two sets of specific input terminals in all in the first embodiment. In addition, each set of specific input terminals respectively corresponds to the HDMI and the Display Port interface. However, please note that the above embodiment is only for an illustrative purpose and is not meant to be a limitation of the present invention.

On the other hand, the detecting module 220 is coupled to the input interface 210. In this embodiment, the detecting module 220 includes a signal frequency detecting unit 222 and a signal frequency comparing unit 224 wherein the signal frequency detecting unit 222 is utilized for detecting signal frequencies respectively transmitted by the input signal Sin in the four signal transmission channels CH0, CH1, CH2, and CH3 so as to generate four signal frequency detecting results corresponding to the four signal transmission channels CH0, CH1, CH2, and CH3; and the signal frequency comparing unit 224 is utilized for comparing the signal frequency detecting results with each other to generate a signal frequency comparing result. Next, the determining unit 230 will determine the transmission format of the input signal Sin according to the signal frequency comparing result. For example, one of the differences between the HDMI transmission format and the Display Port interface transmission format is that the HDMI transmission format uses the above four signal transmission channels CH0, CH1, CH2, and CH3 as three data channels and one clock channel, and the Display Port interface transmission format uses all the above four signal transmission channels CH0, CH1, CH2, and CH3 as the data channels. In addition, what transmitted in the data channels of the HDMI transmission format are the transition-minimized differential signaling clock (TMDS clock) (i.e. the symbol clock), but not the bit clock (i.e. ten times of the TMDS clock (10×TMDS clock)) transmitted in the clock channel of the HDMI transmission format. Thus, the signal frequencies between the three data channels and the clock channel of the HDMI transmission format will have an obvious difference. In general, the signal frequency detected in the data channels of the HDMI transmission format will be over twice higher than the signal frequency detected in the clock channel of the HDMI transmission format. On the other hand, since the Display Port interface transmission format uses all the above four signal transmission channels CH0, CH1, CH2, and CH3 as the data channels, the signal frequency detected in these four signal transmission channels will not have an obvious difference. Thus, the method of the present invention can determine the transmission format of the input signal Sin to be the HDMI transmission format or the Display Port interface transmission format easily by using the above characteristic. The operation process of the determining unit 230 determining the transmission format of the input signal Sin according to the signal frequency comparing result in the signal receiving circuit 200 of the first embodiment in the present invention will be illustrated in the following lines in detail.

When the signal frequency comparing result shows that all ratios between one signal frequency detecting result of the signal frequency detecting results and the other signal frequency detecting results achieve a threshold value, the determining unit 230 will determine the transmission format of the input signal Sin to be the HDMI transmission format; otherwise, when the signal frequency comparing result shows that all the ratios between the signal frequency detecting results do not achieve the threshold value, the determining unit 230 will determine the transmission format of the input signal Sin to be the Display Port interface transmission format, wherein the threshold value is substantially equal to ½. However, please note that the threshold value being equal to ½ is not a necessary limitation of the present invention; that is, the threshold value can be adjusted properly in accordance with different signal data transmission conditions or hardware designs. Please note that the comparing method for the signal frequency comparing result is not limited to comparing the ratio between the signal frequencies, and it is also practical to compare the difference values between the signal frequencies, and the other comparing methods that can attain the same purpose also fall into the disclosed scope of the present invention. In addition, please note that there are many kinds of methods and devices for detecting and comparing the signal frequencies. For example, the present invention can utilize a phase frequency detector (PFD) or a counter to generate a plurality of signal frequency detecting results, and utilize a comparator to compare the signal frequency detecting results with each other so as to generate a signal frequency comparing result. However, the above methods and devices are only for illustrative purposes and are not meant to be limitations of the present invention. Various modifications and alterations of the methods and devices should fall into the disclosed scope of the present invention as long as being able to attain the purpose of detecting and comparing the signal frequencies.

Herein, please note that the first embodiment mentioned above illustrates the technical features of the present invention by taking the differential transmission format as an example. However, a person of average skill in the pertinent art should be able to easily understand that the scheme and method disclosed by the present invention also can be applied to a single terminal transmission format. For the differential transmission format, the set of common input terminals 212 mentioned above includes at least two pins for receiving at least a pair of differential input signals. In addition, for the single terminal transmission format, the set of common input terminals 212 mentioned above includes at least a pin for receiving at least a single terminal input signal.

Figure 4:
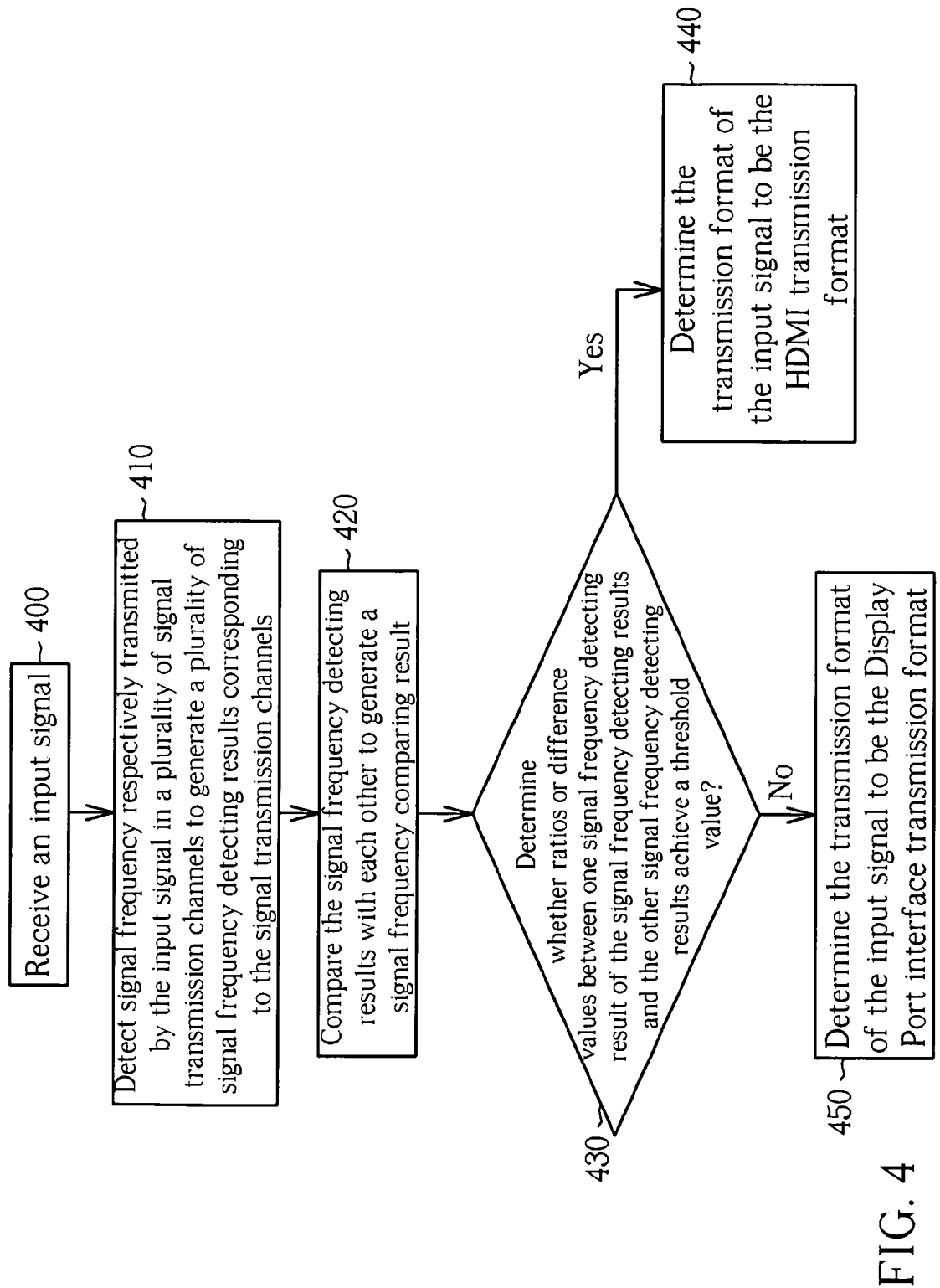
FIG. 4 is a flowchart showing a first embodiment of a signal receiving method for determining a transmission format of an input signal in accordance with the operation schemes of the signal receiving circuit shown in FIG. 3 of the present invention.

Please refer to FIG. 4. FIG. 4 is a flowchart showing a first embodiment of a signal receiving method for determining a transmission format of an input signal in accordance with the operation schemes of the signal receiving circuit 200 mentioned above in the present invention. Provided that substantially the same result is achieved, the steps of the flowchart of this embodiment need not be in the exact order shown in FIG. 4 and need not be contiguous; that is, other steps can be intermediate. The first embodiment of the signal receiving method in the present invention includes the following steps:

Step 400: Receive an input signal.

Step 410: Detect signal frequency respectively transmitted by the input signal in a plurality of signal transmission channels to generate a plurality of signal frequency detecting results corresponding to the signal transmission channels.

Step 420: Compare the signal frequency detecting results with each other to generate a signal frequency comparing result.

Step 430: Determine whether ratios or difference values between one signal frequency detecting result of the signal frequency detecting results and the other signal frequency detecting results achieve a threshold value; if the signal frequency comparing result shows that all the ratios or the difference values between one signal frequency detecting result of the signal frequency detecting results and the other signal frequency detecting results achieve the threshold value, then perform step 440; if the signal frequency comparing result shows that all the ratios or the difference values between the signal frequency detecting results do not achieve the threshold value, then perform step 450.

Step 440: Determine the transmission format of the input signal to be the HDMI transmission format.

Step 450: Determine the transmission format of the input signal to be the Display Port interface transmission format.

Figure 5:
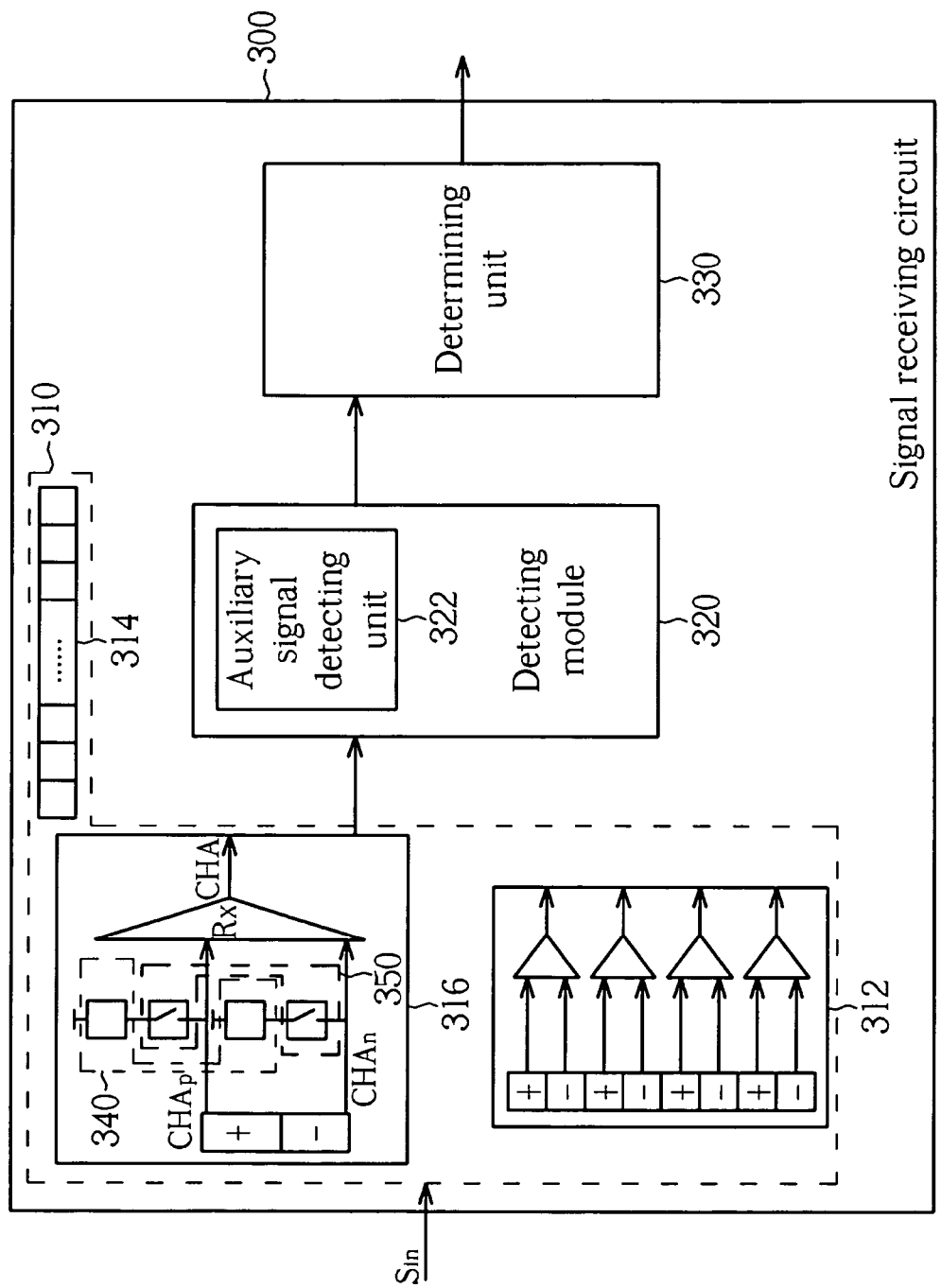
FIG. 5 shows a simplified block diagram of a signal receiving circuit in accordance with a second embodiment of the present invention.
Figure 6:
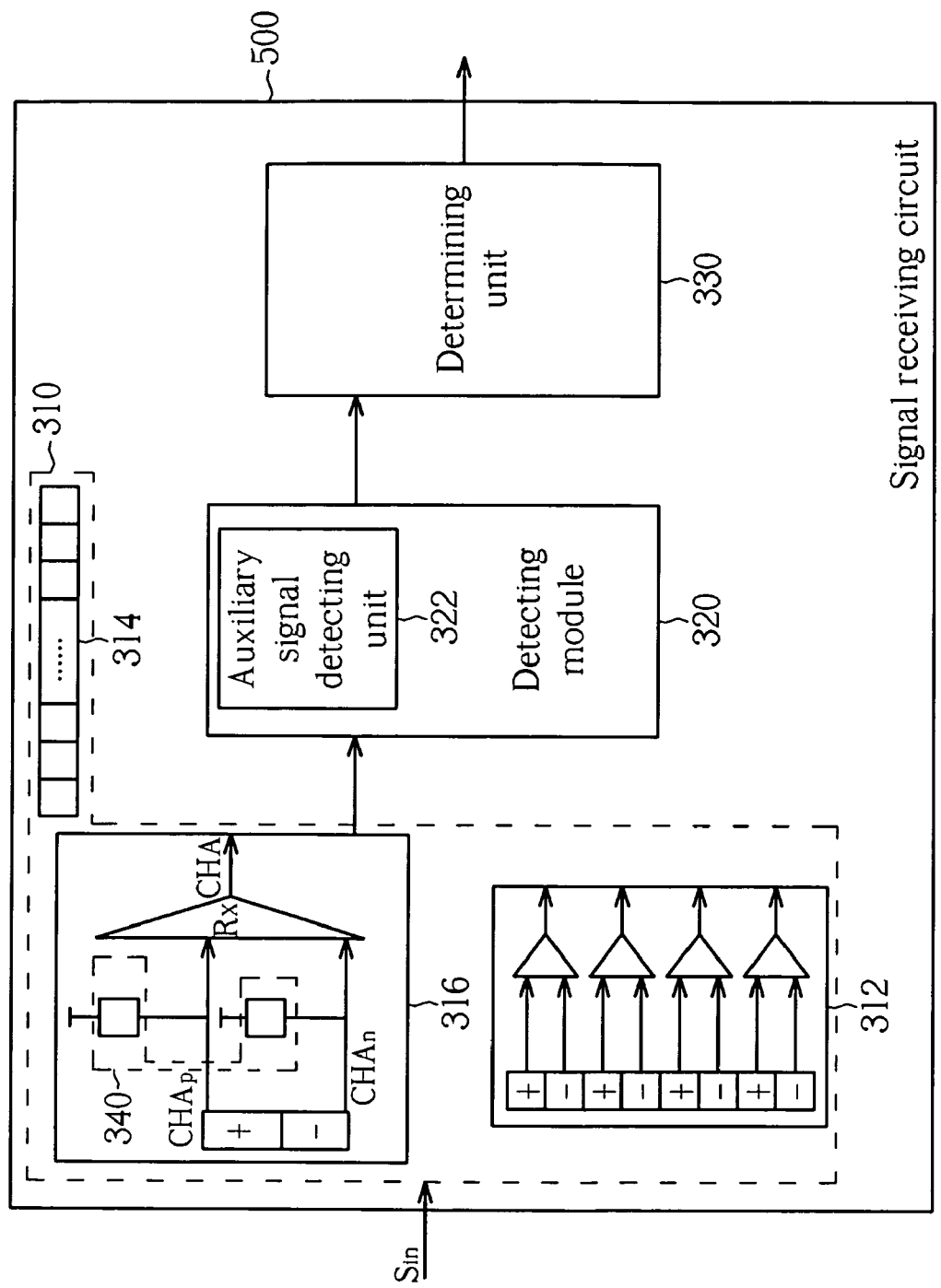
FIG. 6 shows a simplified block diagram of a signal receiving circuit in accordance with a third embodiment of the present invention.

Please refer to FIG. 5. FIG. 5 shows a simplified block diagram of a signal receiving circuit 300 in accordance with a second embodiment of the present invention. As shown in FIG. 5, the signal receiving circuit 300 includes an input interface 310, a detecting module 320, and a determining unit 330, wherein the input interface 310 is utilized for receiving an input signal Sin. In the second embodiment, please note that the input signal Sin can be a signal corresponding to the HDMI transmission format or a signal corresponding to the Display Port interface transmission format in this embodiment. However, these signal transmission formats are only for illustration purposes and are not meant to be limitations of the present invention. In addition, the input interface 310 includes a set of common input terminals 312, a first set of specific input terminals 314, and a second set of specific input terminals 316, wherein the first set of specific input terminals 314 and the set of common input terminals 312 are utilized for receiving the input signal Sin corresponding to the HDMI transmission format, and the second set of specific input terminals 316 and the set of common input terminals 312 are utilized for receiving the input signal Sin corresponding to the Display Port interface transmission format. Please note that the second set of specific input terminals 316 includes a set of differential pair pins as input pins for receiving an auxiliary signal of the Display Port interface transmission format. In addition, the detecting module 320 includes an auxiliary signal detecting unit 322 for generating an auxiliary signal detecting result corresponding to an auxiliary signal transmission channel CHA, and the second set of specific input terminals 316 further includes an input impedance module 340, a switch module 350, a differential auxiliary signal receiver Rx and the auxiliary signal transmission channel CHA mentioned above. In this embodiment, the input impedance module 340 complies with the Display Port interface transmission format, and the switch module 350 is coupled to the input impedance module 340. The switch module 350 is utilized for coupling the input impedance module 340 to auxiliary signal transmission channels (i.e. CHAp and CHAn) in front of the auxiliary signal transmission channel CHA before the auxiliary signal detecting unit 322 generates the auxiliary signal detecting result corresponding to the auxiliary signal transmission channel CHA. In addition, please note that the switch module 350 can be removed in certain specific conditions. For example, in a condition of no other signals except the auxiliary signal of the Display Port interface transmission format will pass the auxiliary signal transmission channel CHA, the switch module 350 can be removed, as shown in FIG. 6. FIG. 6 shows a simplified block diagram of a signal receiving circuit 500 in accordance with a third embodiment of the present invention. In the signal receiving circuit 500, all the elements except the switch module 350 are the same as the elements in the signal receiving circuit 300 shown in FIG. 5, and thus further explanations of the element operation details and related content about the signal receiving circuit 500 are omitted herein for the sake of brevity.

Due to only when the transmission format of the input signal Sin belongs to the Display Port interface transmission format, the auxiliary signal detecting unit 322 will detect an output signal complying with the Display Port interface transmission format or an auxiliary signal of the Display Port interface transmission format in the auxiliary signal transmission channel CHA at the back-end stage of the differential auxiliary signal receiver Rx, thus the method of the present invention can use the above characteristic to determine the transmission format of the input signal Sin either belongs to the HDMI transmission format or the Display Port interface transmission format. The operation process of the determining unit 330 determining the transmission format of the input signal Sin according to the auxiliary signal detecting result in the signal receiving circuit 300 of the second embodiment in the present invention will be illustrated in the following lines in detail. When the auxiliary signal detecting result shows that the auxiliary signal detecting unit 322 detects an output signal complying with the Display Port interface transmission format in the auxiliary signal transmission channel CHA, the determining unit 330 will determine the transmission format of the input signal Sin to be the Display Port interface transmission format; and when the auxiliary signal detecting result shows that the auxiliary signal detecting unit 322 does not detect an output signal complying with the Display Port interface transmission format in the auxiliary signal transmission channel CHA, the determining unit 330 will determine the transmission format of the input signal Sin to be the HDMI interface transmission format.

On the other hand, the operation process of the determining unit 330 determining the transmission format of the input signal Sin according to the auxiliary signal detecting result in the signal receiving circuit 500 of the third embodiment in the present invention will be illustrated in the following lines in detail. When the auxiliary signal detecting result shows that the auxiliary signal detecting unit 322 detects an auxiliary signal of the Display Port interface transmission format in the auxiliary signal transmission channel CHA, the determining unit 330 will determine the transmission format of the input signal Sin to be the Display Port interface transmission format; and when the auxiliary signal detecting result shows that the auxiliary signal detecting unit 322 does not detect an auxiliary signal of the Display Port interface transmission format in the auxiliary signal transmission channel CHA, the determining unit 330 will determine the transmission format of the input signal Sin to be the HDMI interface transmission format.

Herein, please note that the second and the third embodiments mentioned above illustrate the technical features of the present invention by taking the differential transmission format as an example. However, a person of average skill in the pertinent art should be able to easily understand that the scheme and method disclosed by the present invention also can be applied to a single terminal transmission format. For the differential transmission format, the second set of specific input terminals 316 and the set of common input terminals 312 mentioned above respectively include at least two pins for receiving at least a pair of differential input signals. In addition, for the single terminal transmission format, the second set of specific input terminals 316 and the set of common input terminals 312 mentioned above respectively include at least a pin for receiving at least a single terminal input signal.

Figure 7:
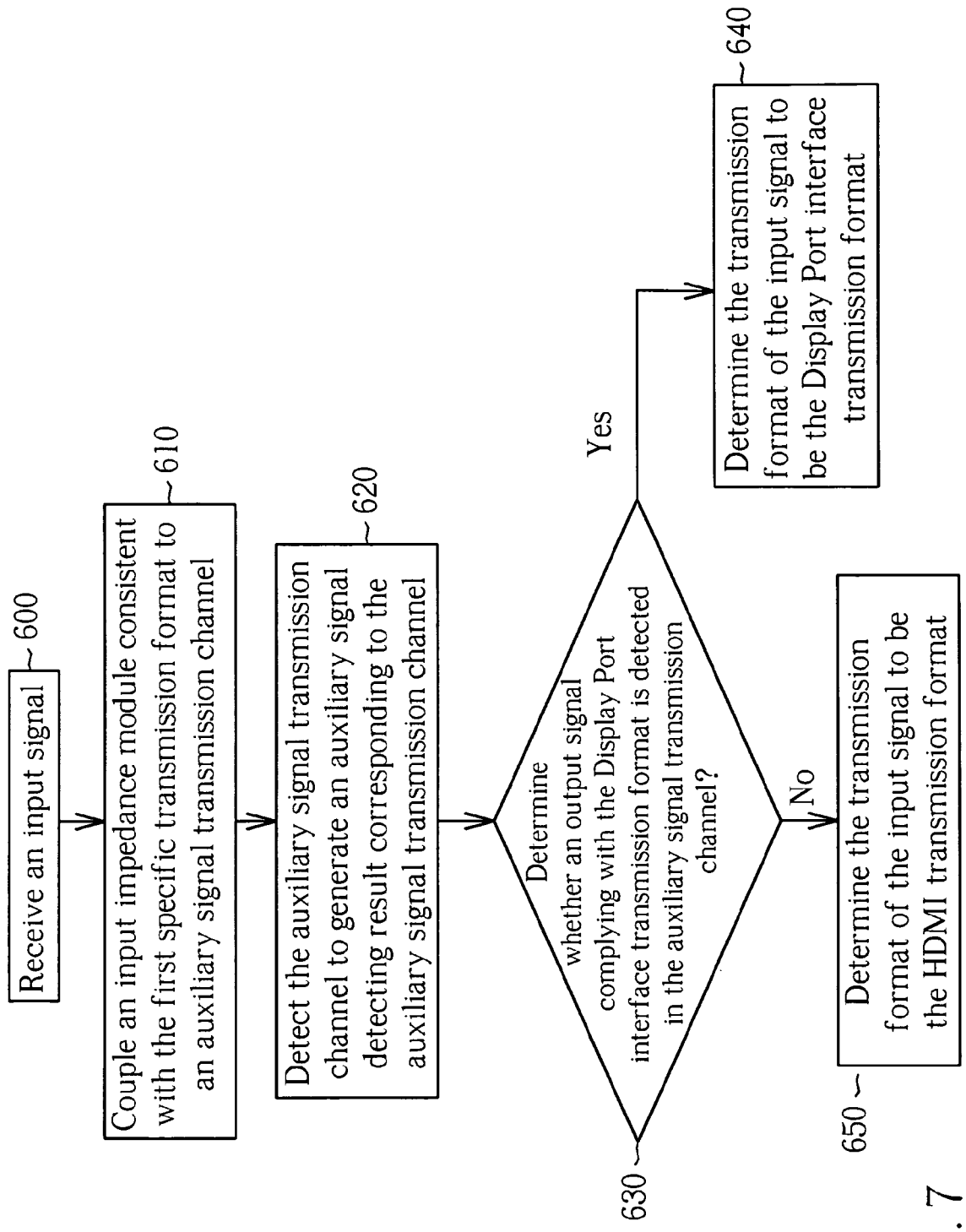
FIG. 7 is a flowchart showing a second embodiment of a signal receiving method for determining a transmission format of an input signal in accordance with the operation schemes of the signal receiving circuit shown in FIG. 5 of the present invention.

Please refer to FIG. 7. FIG. 7 is a flowchart showing a second embodiment of a signal receiving method for determining a transmission format of an input signal in accordance with the operation schemes of the signal receiving circuit 300 mentioned above in the present invention. Provided that substantially the same result is achieved, the steps of the flowchart of this embodiment need not be in the exact order shown in FIG. 7 and need not be contiguous; that is, other steps can be intermediate. The second embodiment of the signal receiving method in the present invention includes the following steps:

Step 600: Receive an input signal.

Step 610: Couple an input impedance module consistent with the first specific transmission format to an auxiliary signal transmission channel.

Step 620: Detect the auxiliary signal transmission channel to generate an auxiliary signal detecting result corresponding to the auxiliary signal transmission channel.

Step 630: Determine whether an output signal complying with the Display Port interface transmission format is detected in the auxiliary signal transmission channel; if the auxiliary signal detecting result shows that an output signal complying with the Display Port interface transmission format is detected in the auxiliary signal transmission channel, then perform step 640; otherwise, perform step 650.

Step 640: Determine the transmission format of the input signal to be the Display Port interface transmission format.

Step 650: Determine the transmission format of the input signal to be the HDMI transmission format.

Figure 8:
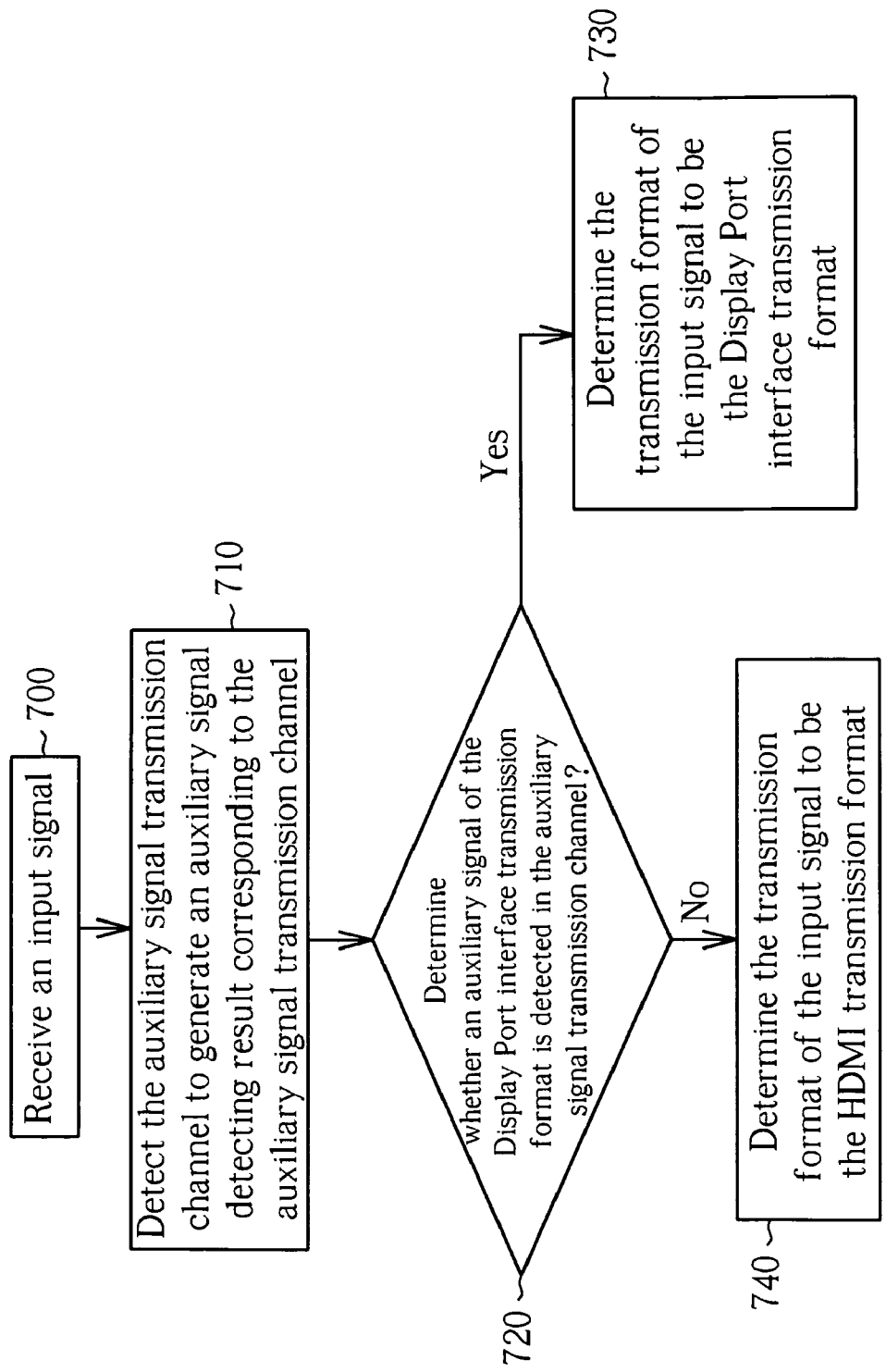
FIG. 8 is a flowchart showing a third embodiment of a signal receiving method for determining a transmission format of an input signal in accordance with the operation schemes of the signal receiving circuit shown in FIG. 6 of the present invention.

Please refer to FIG. 8. FIG. 8 is a flowchart showing a third embodiment of a signal receiving method for determining a transmission format of an input signal in accordance with the operation schemes of the signal receiving circuit 500 mentioned above in the present invention. Provided that substantially the same result is achieved, the steps of the flowchart of this embodiment need not be in the exact order shown in FIG. 8 and need not be contiguous; that is, other steps can be intermediate. The third embodiment of the signal receiving method in the present invention includes the following steps:

Step 700: Receive an input signal.

Step 710: Detect the auxiliary signal transmission channel to generate an auxiliary signal detecting result corresponding to the auxiliary signal transmission channel.

Step 720: Determine whether an auxiliary signal of the Display Port interface transmission format is detected in the auxiliary signal transmission channel; if the auxiliary signal detecting result shows that an auxiliary signal of the Display Port interface transmission format is detected in the auxiliary signal transmission channel, then perform step 730; otherwise, perform step 740.

Step 730: Determine the transmission format of the input signal to be the Display Port interface transmission format.

Step 740: Determine the transmission format of the input signal to be the HDMI transmission format.

Figure 9:
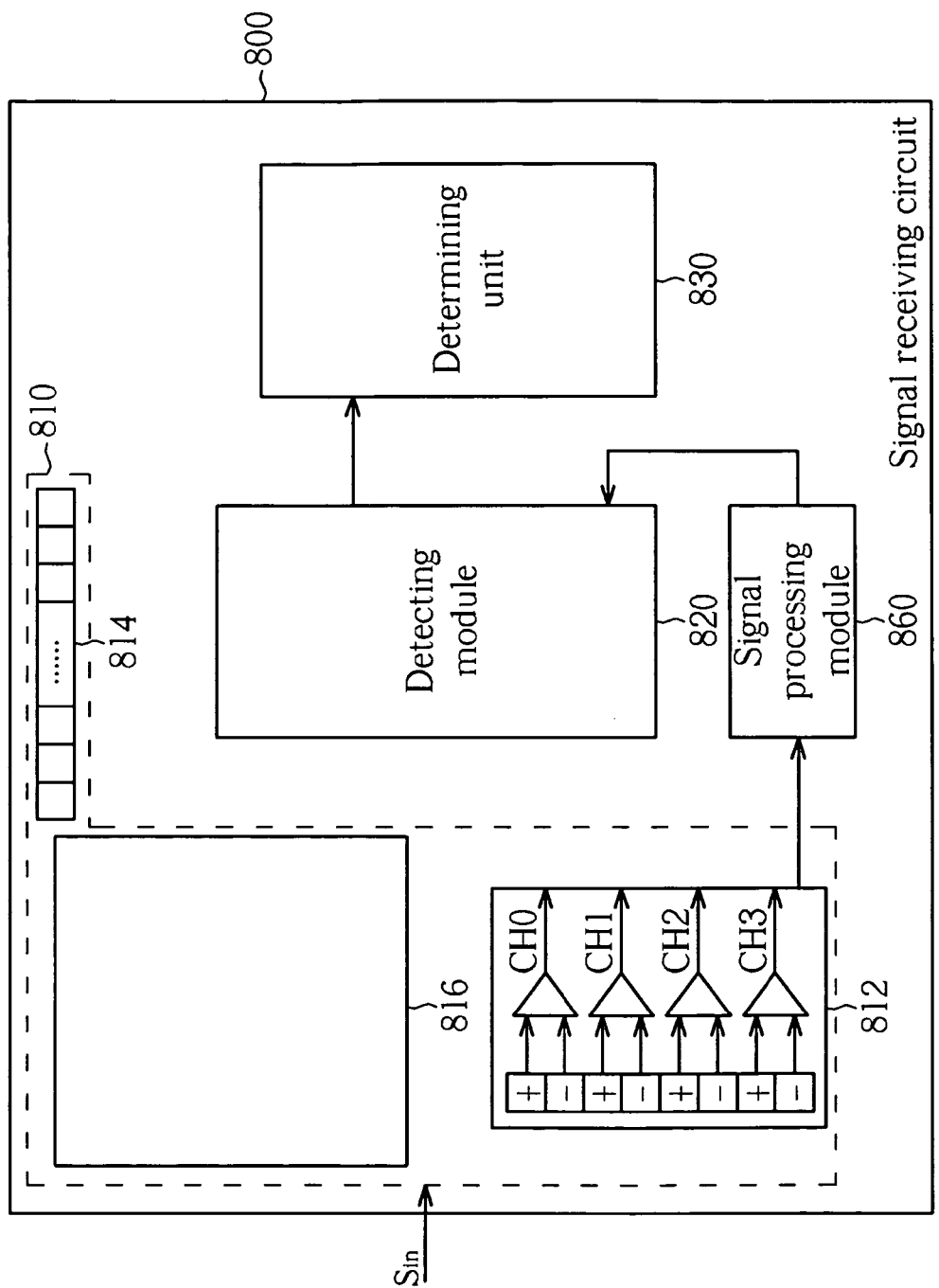
FIG. 9 shows a simplified block diagram of a signal receiving circuit in accordance with a fourth embodiment of the present invention.

Please refer to FIG. 9. FIG. 9 shows a simplified block diagram of a signal receiving circuit 800 in accordance with a fourth embodiment of the present invention. As shown in FIG. 9, the signal receiving circuit 800 includes an input interface 810, a detecting module 820, a determining unit 830, and a signal processing module 860 wherein the input interface 810 is utilized for receiving an input signal Sin. In the fourth embodiment, please note that the input signal Sin can be a signal corresponding to the HDMI transmission format or a signal corresponding to the Display Port interface transmission format in this embodiment. However, these signal transmission formats are only for illustration purposes and are not meant to be limitations of the present invention. In addition, the input interface 810 includes a set of common input terminals 812, a first set of specific input terminals 814, and a second set of specific input terminals 816, wherein the first set of specific input terminals 814 and the set of common input terminals 812 are utilized for receiving the input signal Sin corresponding to the HDMI transmission format, and the second set of specific input terminals 816 and the set of common input terminals 812 are utilized for receiving the input signal Sin corresponding to the Display Port interface transmission format. In addition, the signal processing module 860 is coupled to the input interface 810 and the detecting module 820, and utilized for performing a signal processing operation on the input signal Sin according to a predetermined specific transmission format (such as the Display Port interface transmission format), so as to generate a signal processing result. The detecting module 820 is utilized for detecting the signal processing result to generate a signal detecting result. In the fourth embodiment, the method of the present invention uses a trial and error scheme to determine the transmission format of the input signal Sin either belongs to the HDMI transmission format or the Display Port interface transmission format. The operation process of the determining unit 830 determining the transmission format of the input signal Sin according to the auxiliary signal detecting result in the signal receiving circuit 800 of the fourth embodiment in the present invention will be illustrated in the following lines in detail.

When the signal detecting result shows that a specific signal processing error occurs, the determining unit 830 will determine the transmission format of the input signal Sin is not the predetermined specific transmission format (i.e. not the Display Port interface transmission format, but the HDMI interface transmission format); and when the signal detecting result shows that there is no signal processing error occurring, the determining unit 830 will determine the transmission format of the input signal Sin to be the predetermined specific transmission format (i.e. the Display Port interface transmission format). For example, the signal processing module 860 can include a signal clock data recovery (CDR) circuit (not shown), a decoder consistent with the Display Port interface transmission format (not shown), and a decoder consistent with the HDMI transmission format (not shown), and the signal processing operation can be a signal decoding operation or a signal CDR operation (i.e. the specific signal processing error can be a signal decoding error or a signal CDR error). However, those mentioned above are only for illustrative purposes and are not meant to be limitations of the present invention.

In addition, please note that the fourth embodiment mentioned above illustrates the technical features of the present invention by taking the differential transmission format as an example. However, a person of average skill in the pertinent art should be able to easily understand that the scheme and method disclosed by the present invention also can be applied to a single terminal transmission format. For the differential transmission format, the set of common input terminals 812 mentioned above includes at least two pins for receiving at least a pair of differential input signals. In addition, for the single terminal transmission format, the set of common input terminals 812 mentioned above includes at least a pin for receiving at least a single terminal input signal.

Figure 10:
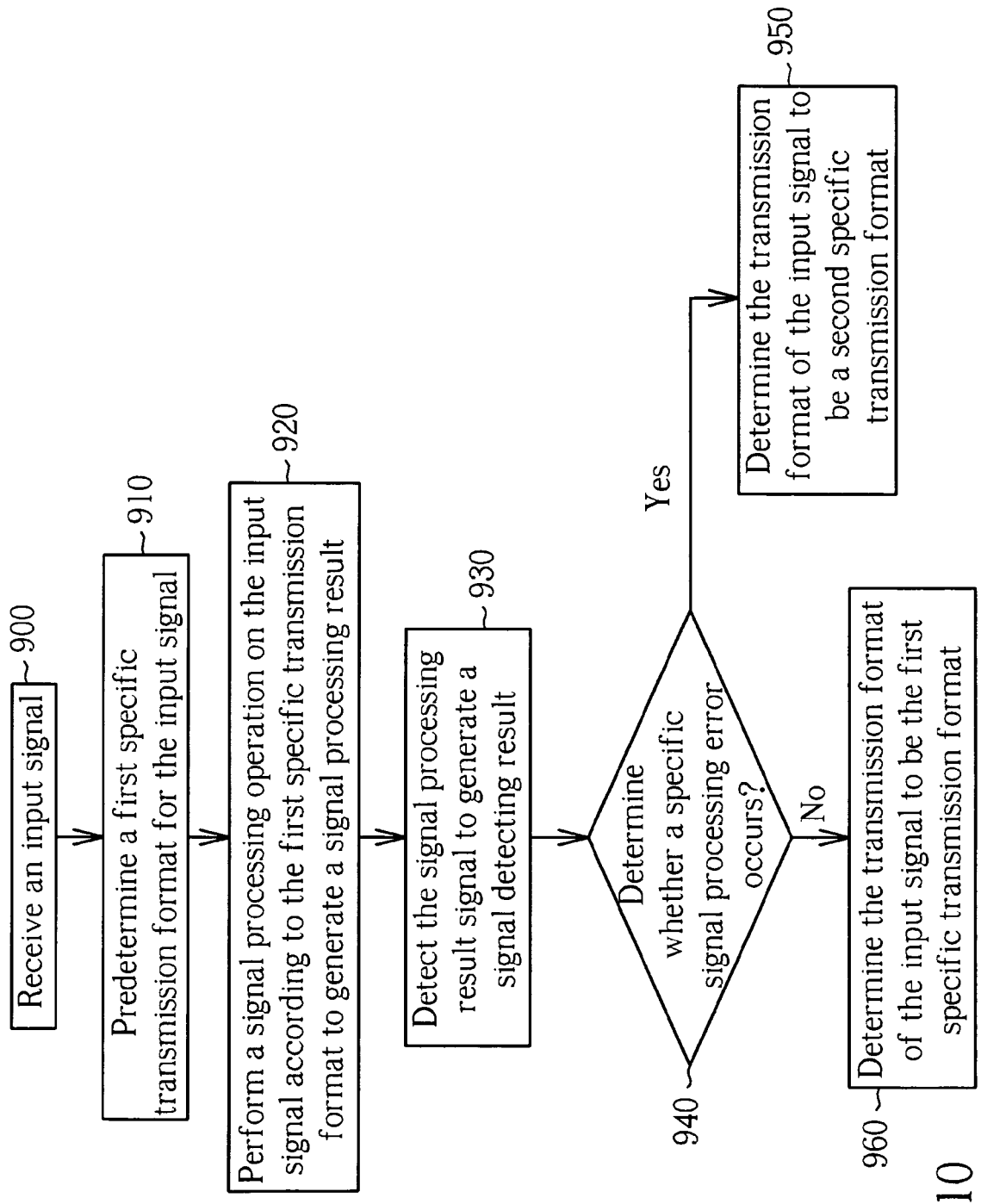
FIG. 10 is a flowchart showing a fourth embodiment of a signal receiving method for determining a transmission format of an input signal in accordance with the operation schemes of the signal receiving circuit shown in FIG. 9 of the present invention.

Please refer to FIG. 10. FIG. 10 is a flowchart showing a fourth embodiment of a signal receiving method for determining a transmission format of an input signal in accordance with the operation schemes of the signal receiving circuit 800 mentioned above in the present invention. Provided that substantially the same result is achieved, the steps of the flowchart of this embodiment need not be in the exact order shown in FIG. 10 and need not be contiguous; that is, other steps can be intermediate. The fourth embodiment of the signal receiving method in the present invention includes the following steps:

Step 900: Receive an input signal.

Step 910: Predetermine a first specific transmission format for the input signal.

Step 920: Perform a signal processing operation on the input signal according to the first specific transmission format to generate a signal processing result.

Step 930: Detect the signal processing result signal to generate a signal detecting result.

Step 940: Determine whether a specific signal processing error occurs; if the signal detecting result shows that a specific signal processing error occurs, then perform step 950; otherwise, perform step 960.

Step 950: Determine the transmission format of the input signal to be a second specific transmission format.

Step 960: Determine the transmission format of the input signal to be the first specific transmission format.

Figure 11:
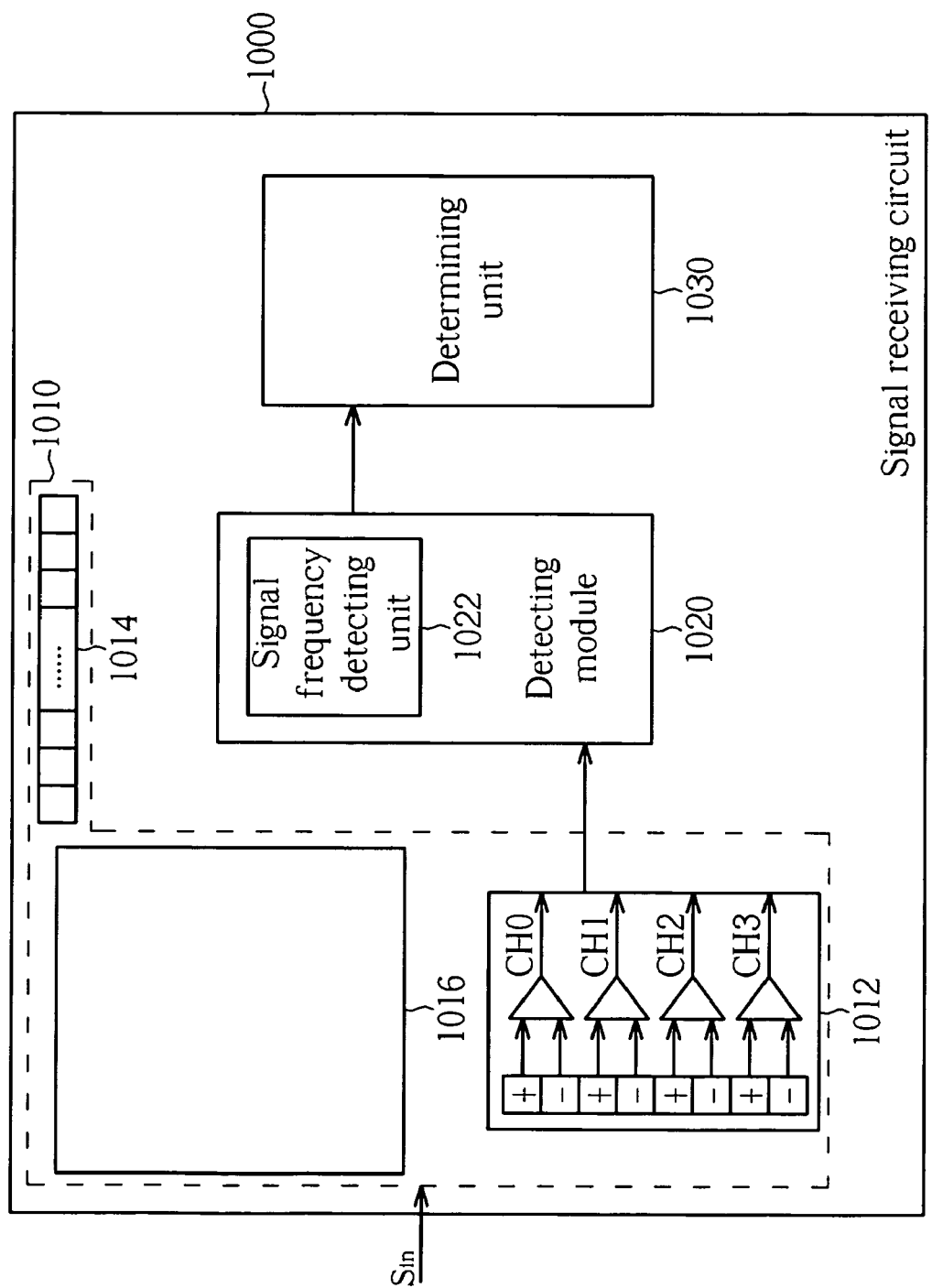
FIG. 11 shows a simplified block diagram of a signal receiving circuit in accordance with a first embodiment of the present invention.

Please refer to FIG. 11. FIG. 11 shows a simplified block diagram of a signal receiving circuit 1000 in accordance with a first embodiment of the present invention. As shown in FIG. 11, the signal receiving circuit 1000 includes an input interface 1010, a detecting module 1020, and a determining unit 1030, wherein the input interface 1010 is utilized for receiving an input signal Sin. In the fifth embodiment, please note that the input signal Sin can be a signal corresponding to the HDMI transmission format or a signal corresponding to the Display Port interface transmission format in this embodiment. However, these signal transmission formats are only for illustration purposes and are not meant to be limitations of the present invention. In addition, the input interface 1010 includes a set of common input terminals 1012, a first set of specific input terminals 1014, and a second set of specific input terminals 1016, wherein the first set of specific input terminals 1014 and the set of common input terminals 1012 are utilized for receiving the input signal Sin corresponding to the HDMI transmission format, and the second set of specific input terminals 1016 and the set of common input terminals 1012 are utilized for receiving the input signal Sin corresponding to the Display Port interface transmission format. In addition, it is known from the prior art that both the above two transmission interfaces use four sets of differential pair pins as main input terminals for transmitting video and audio data thereof, and thus the set of common input terminals 1012 has four signal transmission channels CH0, CH1, CH2, and CH3 in all. Please note that there are two sets of specific input terminals in all in the first embodiment. In addition, each set of specific input terminals respectively corresponds to the HDMI and the Display Port interface. However, please note that the above embodiment is only for an illustrative purpose and is not meant to be a limitation of the present invention.

On the other hand, the detecting module 1020 is coupled to the input interface 1010, and the detecting module 1020 includes a signal frequency detecting unit 1022 utilized for detecting whether there is the input signal Sin in the four signal transmission channels CH0, CH1, CH2, and CH3 mentioned above so as to generate a signal detecting result. The signal detecting result will show whether the input signal Sin is detected in the signal transmission channels CH0, CH1, CH2, and CH3, and the determining unit 1030 is utilized for determining the transmission format of the input signal Sin in accordance with the signal detecting result. For example, the Display Port interface transmission format can have three different configurations of single channel (1× channel), dual channels (2× channel), and four channels (4× channel), and the HDMI transmission format only has one configuration of 4× channel. Thus, the method of the present invention can determine whether the transmission format of the input signal Sin belongs to the Display Port interface transmission format easily by using the above characteristic. The operation process of the determining unit 1030 determining the transmission format of the input signal Sin according to the signal detecting result in the signal receiving circuit 1000 of the fifth embodiment in the present invention will be illustrated in the following lines in detail.

When the signal detecting result shows that the input signal Sin is not detected in at least one of the signal transmission channels CH0, CH1, CH2, and CH3, the determining unit 1030 can determine the transmission format of the input signal Sin is not the HDMI transmission format since the HDMI transmission format will use all the signal transmission channels CH0, CH1, CH2, and CH3. That is, the determining unit 1030 can determine that the transmission format of the input signal Sin is the Display Port interface transmission format. However, if the signal detecting result shows that the input signal Sin is detected in all of the signal transmission channels CH0, CH1, CH2, and CH3 in the fifth embodiment of the present invention, then the determining unit 1030 can not determine that the transmission format of the input signal Sin is the Display Port interface transmission format or the HDMI transmission format since the transmission format of the input signal Sin may be the Display Port interface transmission format using the 4× channel configuration or the HDMI transmission format using the 4× channel configuration. At this time, the schemes and methods of the first, the second, the third, and the fourth embodiments can be utilized to further determine the transmission format of the input signal Sin.

Herein, please note that the fifth embodiment mentioned above illustrates the technical features of the present invention by taking the differential transmission format as an example. However, a person of average skill in the pertinent art should be able to easily understand that the scheme and method disclosed by the present invention also can be applied to a single terminal transmission format. For the differential transmission format, the set of common input terminals 1012 mentioned above includes at least two pins for receiving at least a pair of differential input signals. In addition, for the single terminal transmission format, the set of common input terminals 1012 mentioned above includes at least a pin for receiving at least a single terminal input signal.

Figure 12:
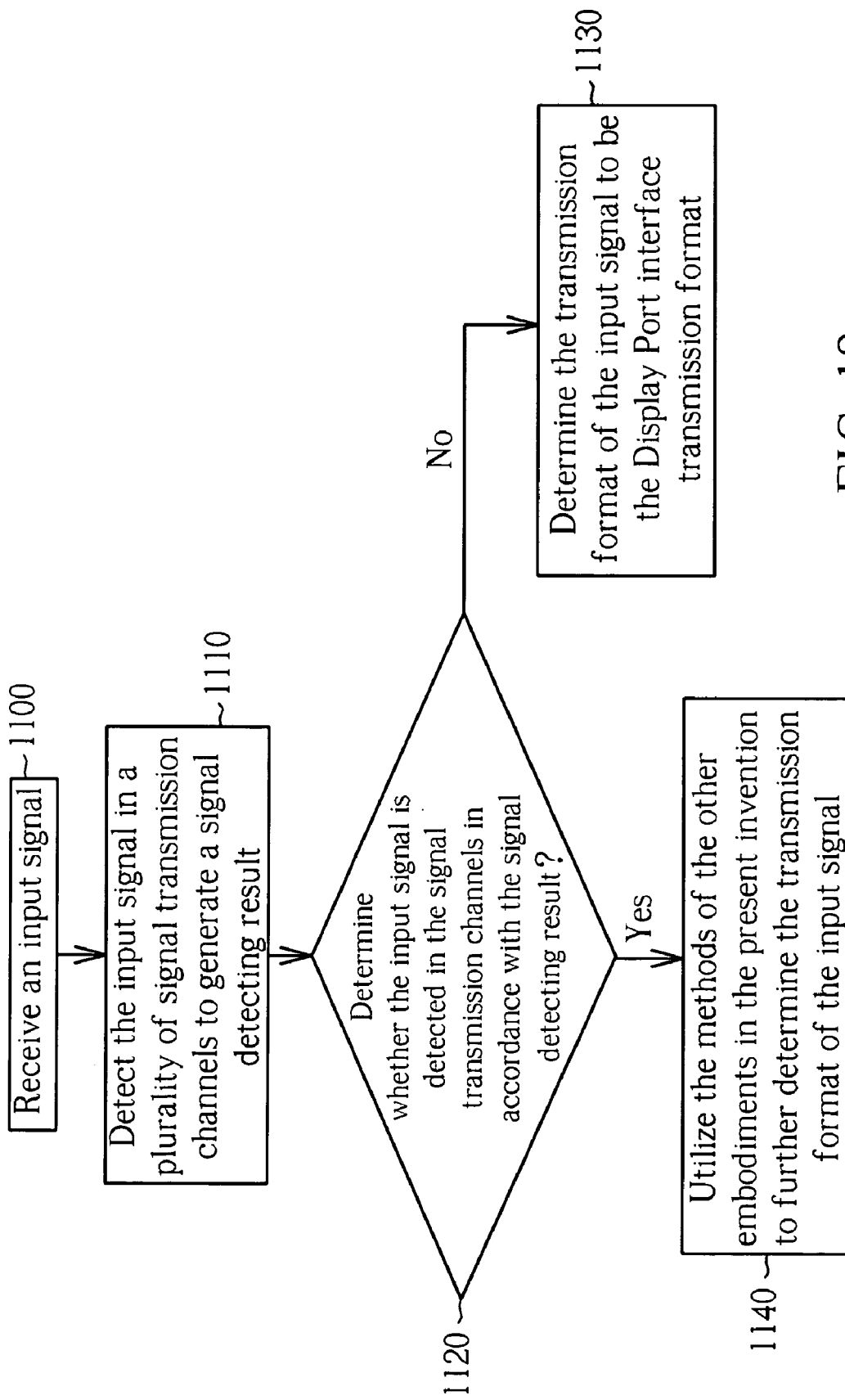
FIG. 12 is a flowchart showing a fifth embodiment of a signal receiving method for determining a transmission format of an input signal in accordance with the operation schemes of the signal receiving circuit shown in FIG. 11 of the present invention.

Please refer to FIG. 12. FIG. 12 is a flowchart showing a fifth embodiment of a signal receiving method for determining a transmission format of an input signal in accordance with the operation schemes of the signal receiving circuit 1000 mentioned above in the present invention. Provided that substantially the same result is achieved, the steps of the flowchart of this embodiment need not be in the exact order shown in FIG. 12 and need not be contiguous; that is, other steps can be intermediate. The fifth embodiment of the signal receiving method in the present invention includes the following steps:

Step 1100: Receive an input signal.

Step 1110: Detect the input signal in a plurality of signal transmission channels to generate a signal detecting result.

Step 1120: Determine whether the input signal is detected in the signal transmission channels in accordance with the signal detecting result; if the signal detecting result shows that the input signal is not detected in one of the signal transmission channels, then perform step 1130; otherwise, perform step 1140.

Step 1130: Determine the transmission format of the input signal to be the Display Port interface transmission format.

Step 1140: Utilize the methods of the other embodiments in the present invention to further determine the transmission format of the input signal.

Figure 13:
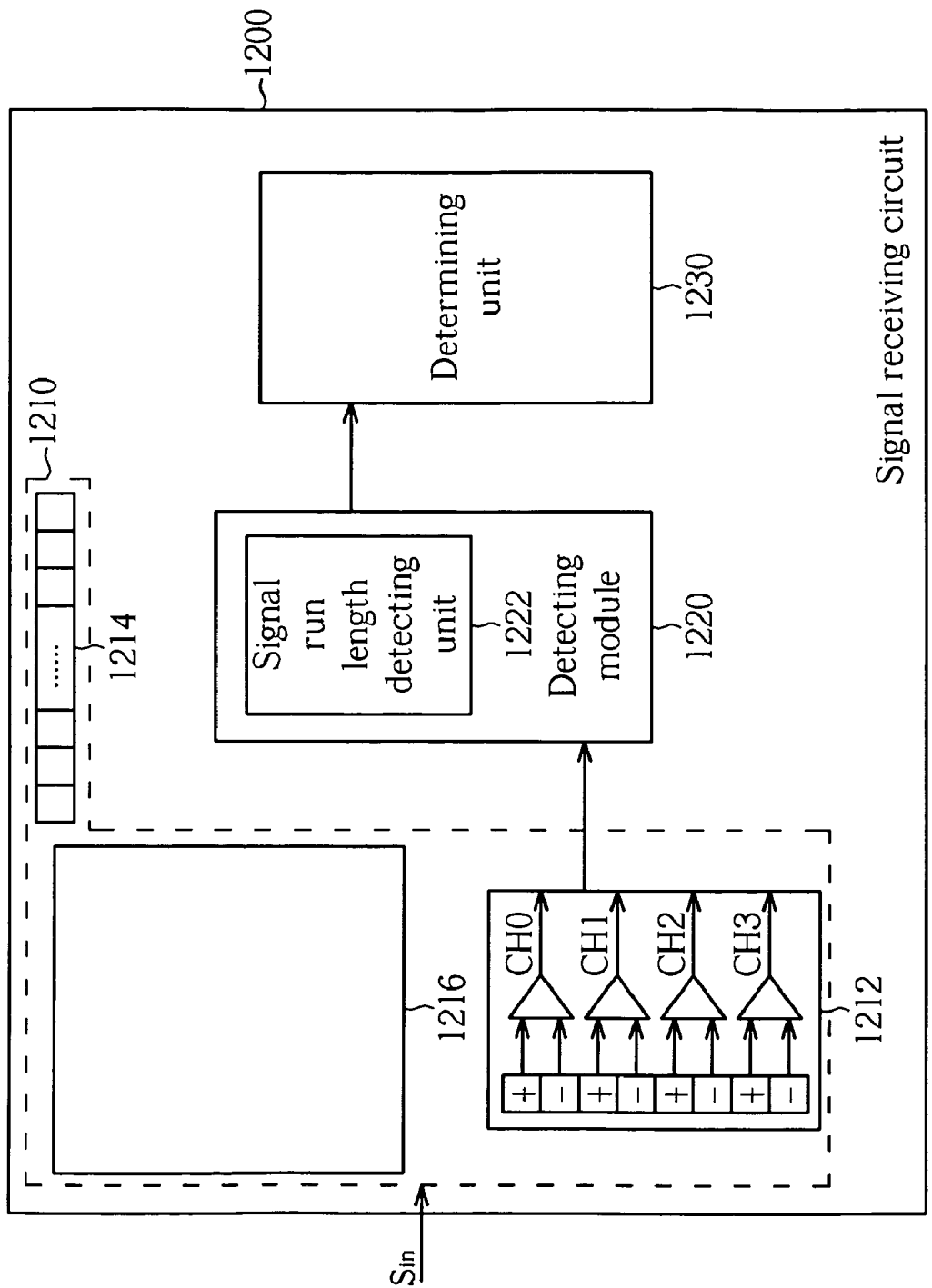
FIG. 13 shows a simplified block diagram of a signal receiving circuit in accordance with a sixth embodiment of the present invention.

Please refer to FIG. 13. FIG. 13 shows a simplified block diagram of a signal receiving circuit 1200 in accordance with a sixth embodiment of the present invention. As shown in FIG. 13, the signal receiving circuit 1200 includes an input interface 1210, a detecting module 1220, and a determining unit 1230, wherein the input interface 1210 is utilized for receiving an input signal Sin. In the fifth embodiment, please note that the input signal Sin can be a signal corresponding to the HDMI transmission format or a signal corresponding to the Display Port interface transmission format in this embodiment. However, these signal transmission formats are only for illustration purposes and are not meant to be limitations of the present invention. In addition, the input interface 1210 includes a set of common input terminals 1212, a first set of specific input terminals 1214, and a second set of specific input terminals 1216, wherein the first set of specific input terminals 1214 and the set of common input terminals 1212 are utilized for receiving the input signal Sin corresponding to the HDMI transmission format, and the second set of specific input terminals 1216 and the set of common input terminals 1212 are utilized for receiving the input signal Sin corresponding to the Display Port interface transmission format. In addition, since the above two transmission interfaces use four sets of differential pair pins as main input terminals for transmitting video and audio data thereof, thus this embodiment will perform the decision in accordance with the four differential pairs of input signals. The detecting module 1220 is coupled to the input interface 1210, and the detecting module 1220 includes a signal run length detecting unit 1222 for detecting signal maximum run length respectively transmitted by the input signal Sin in the four signal transmission channels CH0, CH1, CH2, and CH3 to generate a plurality of signal maximum run length detecting results corresponding to the four signal transmission channels CH0, CH1, CH2, and CH3. The signal maximum run length detecting results will show whether the signal run length detecting unit 1222 detects that difference values between the signal maximum run length detecting results of the input signal Sin and a specific signal maximum run length are greater than a threshold value, and the determining unit 1230 determines the transmission format of the input signal Sin in accordance with the signal maximum run length detecting results. For example, the maximum run length of a data stream in the Display Port encoding is equal to 5, and the maximum run length of a data stream or a clock signal of the HDMI is much larger than 5. Thus, it is practical to determine the transmission format of the input signal Sin in accordance with the signal maximum run length of the input signal Sin. However, please note that the above embodiment is only for an illustrative purpose and is not meant to be a limitation of the present invention.

Figure 14:
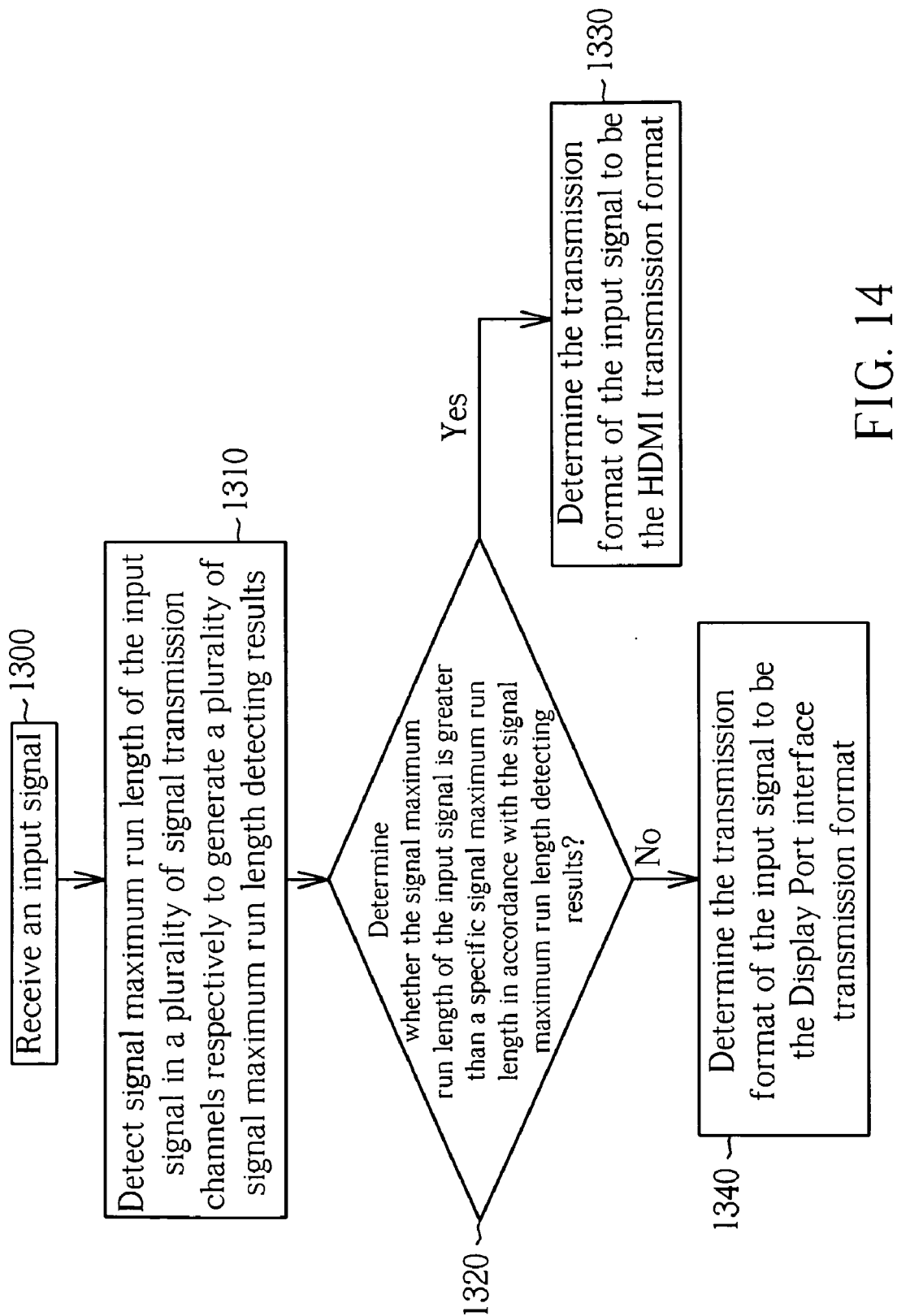
FIG. 14 is a flowchart showing a sixth embodiment of a signal receiving method for determining a transmission format of an input signal in accordance with the operation schemes of the signal receiving circuit shown in FIG. 13 of the present invention.

Please refer to FIG. 14. FIG. 14 is a flowchart showing a sixth embodiment of a signal receiving method for determining a transmission format of an input signal in accordance with the operation schemes of the signal receiving circuit 1000 mentioned above in the present invention. Provided that substantially the same result is achieved, the steps of the flowchart of this embodiment need not be in the exact order shown in FIG. 14 and need not be contiguous; that is, other steps can be intermediate. The sixth embodiment of the signal receiving method in the present invention includes the following steps:

Step 1300: Receive an input signal.

Step 1310: Detect signal maximum run length of the input signal in a plurality of signal transmission channels respectively to generate a plurality of signal maximum run length detecting results.

Step 1320: Determine whether the signal maximum run length of the input signal is greater than a specific signal maximum run length in accordance with the signal maximum run length detecting results; if the signal maximum run length detecting results shows that the signal maximum run length of one of the signal transmission channels is greater than the specific signal maximum run length, then perform step 1330; otherwise, perform step 1340.

Step 1330: Determine the transmission format of the input signal to be the HDMI transmission format.

Step 1340: Determine the transmission format of the input signal to be the Display Port interface transmission format.

Figure 15:
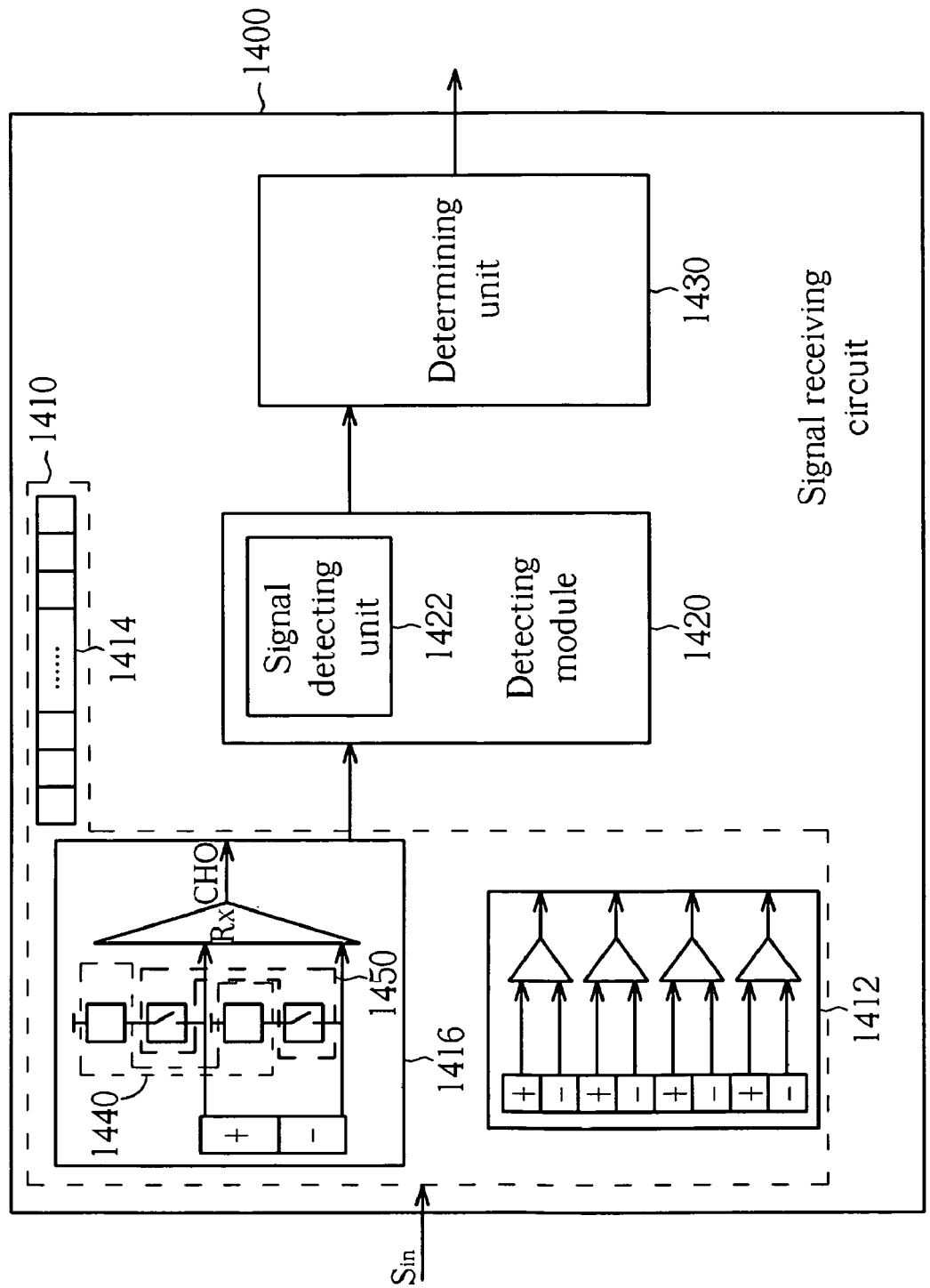
FIG. 15 shows a simplified block diagram of a signal receiving circuit in accordance with a seventh embodiment of the present invention.

Please refer to FIG. 15. FIG. 15 shows a simplified block diagram of a signal receiving circuit 1400 in accordance with a seventh embodiment of the present invention. As shown in FIG. 15, the signal receiving circuit 1400 includes an input interface 1410, a detecting module 1420, and a determining unit 1430, wherein the input interface 1410 is utilized for receiving an input signal Sin. In the second embodiment, please note that the input signal Sin can be a signal corresponding to the HDMI transmission format or a signal corresponding to the Display Port interface transmission format in this embodiment. However, these signal transmission formats are only for illustration purposes and are not meant to be limitations of the present invention. In addition, the input interface 1410 includes a set of common input terminals 1412, a first set of specific input terminals 1414, and a second set of specific input terminals 1416, wherein the first set of specific input terminals 1414 and the set of common input terminals 1412 are utilized for receiving the input signal Sin corresponding to the Display Port interface transmission format, and the second set of specific input terminals 1416 and the set of common input terminals 1412 are utilized for receiving the input signal Sin corresponding to the HDMI transmission format. In addition, the detecting module 1420 includes an signal detecting unit 1422 for generating an signal detecting result, and the second set of specific input terminals 1416 further includes an input impedance module 1440, a switch module 1450, a differential signal receiver Rx and the four signal transmission channel CH0, CH1 (not shown), CH2 (not shown), and CH3 (not shown). In this embodiment, the switch module 1450 is coupled to the input impedance module 1440, and the switch module 1450 is utilized for selectively coupling the input impedance module 1440 to one of the signal transmission channels CH0, CH1, CH2, and CH3. In this embodiment, the signal transmission channel CH0 is utilized for illustration, and please note that it is not meant to be a limitation of the present invention.

Due to if the switch module 1450 does not couple the input impedance module 1440 to one of the signal transmission channels CH0, CH1, CH2, and CH3 (such as the signal transmission channel CH0 shown in FIG. 15), the signal detecting unit 1422 will not detect an output signal complying with the HDMI transmission format, thus the method of the present invention can use the above characteristic to determine the transmission format of the input signal Sin either belongs to the HDMI transmission format or the Display Port interface transmission format. The operation process of the determining unit 1430 determining the transmission format of the input signal Sin according to the signal detecting result in the signal receiving circuit 1400 of the second embodiment in the present invention will be illustrated in the following lines in detail. At first, the switch module 1450 between the input impedance module 1440 and the signal transmission channel CH0 is turned off (i.e., the switch module 1450 is not conducting). Next, if the signal detecting result shows that the signal detecting unit 1422 detects an output signal, then the determining unit 1430 will determine the transmission format of the input signal Sin to be the Display Port interface transmission format; and if the auxiliary signal detecting result shows that the signal detecting unit 1422 does not detect any output signal, then the determining unit 1430 will determine the transmission format of the input signal Sin to be the HDMI interface transmission format.

Herein, please note that the seventh embodiment mentioned above illustrates the technical features of the present invention by taking the differential transmission format as an example. However, a person of average skill in the pertinent art should be able to easily understand that the scheme and method disclosed by the present invention also can be applied to a single terminal transmission format. For the differential transmission format, the second set of specific input terminals 1416 and the set of common input terminals 1412 mentioned above respectively include at least two pins for receiving at least a pair of differential input signals. In addition, for the single terminal transmission format, the second set of specific input terminals 1416 and the set of common input terminals 1412 mentioned above respectively include at least a pin for receiving at least a single terminal input signal.

Figure 16:
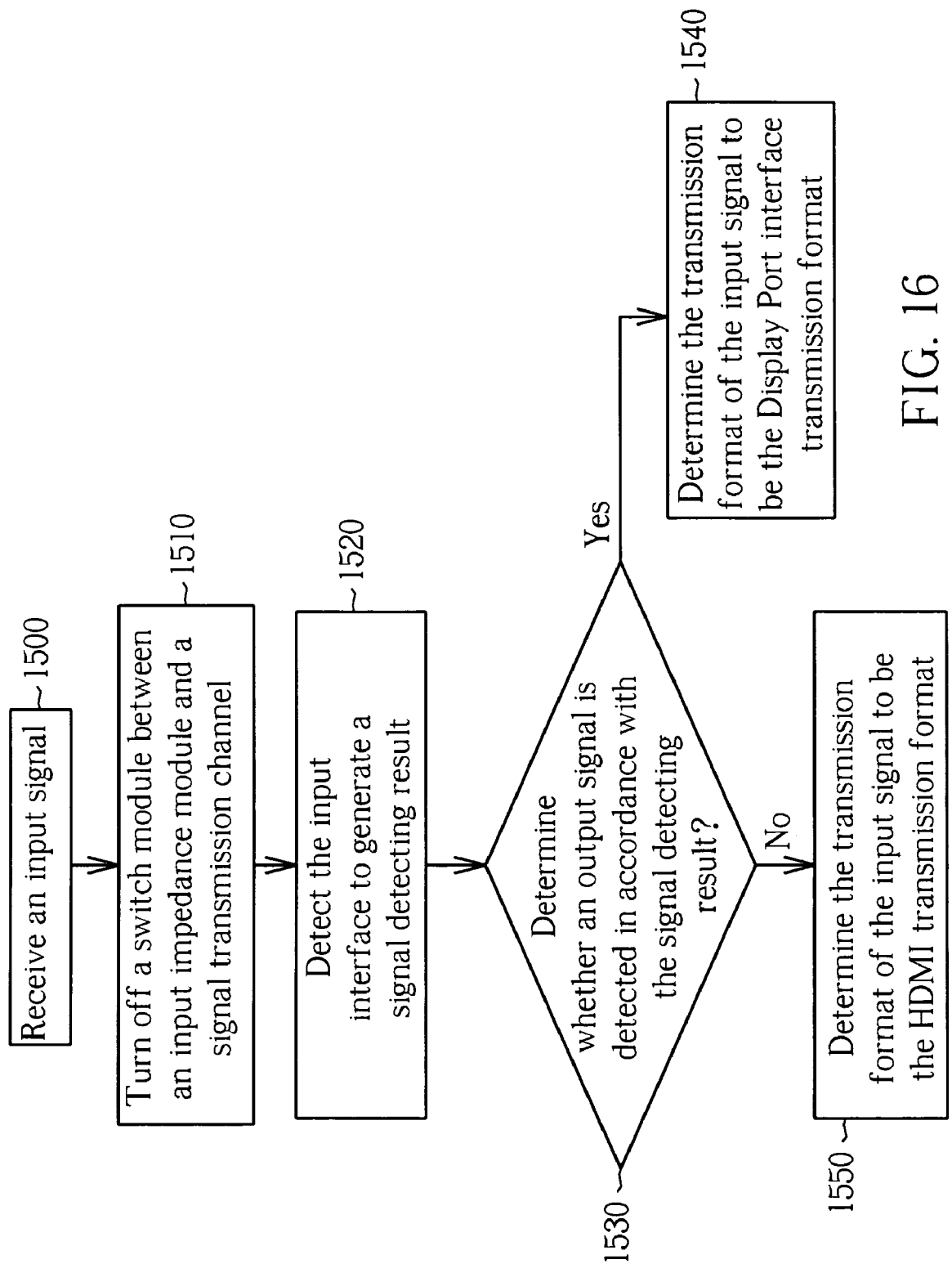
FIG. 16 is a flowchart showing a seventh embodiment of a signal receiving method for determining a transmission format of an input signal in accordance with the operation schemes of the signal receiving circuit mentioned above in the present invention.

Please refer to FIG. 16. FIG. 16 is a flowchart showing a seventh embodiment of a signal receiving method for determining a transmission format of an input signal in accordance with the operation schemes of the signal receiving circuit 1400 mentioned above in the present invention. Provided that substantially the same result is achieved, the steps of the flowchart of this embodiment need not be in the exact order shown in FIG. 16 and need not be contiguous; that is, other steps can be intermediate. The seventh embodiment of the signal receiving method in the present invention includes the following steps:

Step 1500: Receive an input signal.

Step 1510: Turn off a switch module between an input impedance module and a signal transmission channel.

Step 1520: Detect the input interface to generate a signal detecting result.

Step 1530: Determine whether an output signal is detected in accordance with the signal detecting result; if the signal detecting result shows that an output signal is detected, then perform step 1540; otherwise, perform step 1550.

Step 1540: Determine the transmission format of the input signal to be the Display Port interface transmission format.

Step 1550: Determine the transmission format of the input signal to be the HDMI transmission format.

Herein, please note that each of the above embodiments is only for an illustrative purpose and is not meant to be a limitation of the present invention. For example, in a condition without departing from the spirit of the present invention, other embodiments of the schemes and methods in the present invention can selectively use one of the above six methods or use the above six methods in a different sequence in accordance with the practical design requirements of the various signal receiving circuits having the input interface including a plurality of common input terminals corresponding to the different transmission formats.

Briefly summarized, the schemes and methods disclosed by the present invention can use the differences or the different characteristics between various signal transmission formats to correctly determine a transmission format of an input signal in the various signal receiving circuits having the input interface including a plurality of common input terminals corresponding to the different transmission formats.

Those skilled in the art will readily observe that numerous modifications and alterations of the device and method may be made while retaining the teachings of the invention.

What is claimed is:

1. A signal receiving method for determining a transmission format of an input signal, the signal receiving method comprising:

utilizing an input interface including a set of common input terminals, a first set of specific input terminals, and a second set of specific input terminals for receiving the input signal, wherein the first set of specific input terminals and the set of common input terminals are utilized for receiving the input signal corresponding to a specific transmission format, and the second set of specific input terminals and the set of common input terminals are utilized for receiving the input signal corresponding to another specific transmission format;

generating a signal detecting result corresponding to at least a signal transmission channel of a plurality of signal transmission channels according to an output result of the signal transmission channel; and determining the transmission format of the input signal according to the signal detecting result.

2. The signal receiving method of claim 1, wherein the step of generating the signal detecting result corresponding to the signal transmission channel further comprises:

detecting signal frequency respectively transmitted by the input signal in the signal transmission channels to generate a plurality of signal frequency detecting results corresponding to the signal transmission channels.

3. The signal receiving method of claim 2, wherein the step of determining the transmission format of the input signal according to the signal frequency detecting results further comprises:

comparing the signal frequency detecting results with each other to generate a signal frequency comparing result; and determining the transmission format of the input signal according to the signal frequency comparing result.

4. The signal receiving method of claim 3, wherein the step of determining the transmission format of the input signal according to the signal frequency comparing result further comprises:

determining the transmission format of the input signal to be a first specific transmission format when the signal frequency comparing result shows that all ratios between one signal frequency detecting result and remaining signal frequency detecting results of the signal frequency detecting results are not smaller than a threshold value; and determining the transmission format of the input signal to be a second specific transmission format when the signal frequency comparing result shows that not all the ratios between the signal frequency detecting results are not smaller than the threshold value.

5. The signal receiving method of claim 3, wherein the step of determining the transmission format of the input signal according to the signal frequency comparing result further comprises:

determining the transmission format of the input signal to be a first specific transmission format when the signal frequency comparing result shows that all difference values between one signal frequency detecting result and remaining signal frequency detecting results of the signal frequency detecting results are not smaller than a threshold value; and determining the transmission format of the input signal to be a second specific transmission format when the signal frequency comparing result shows that not all the difference values between the signal frequency detecting results are not smaller than the threshold value.

6. The signal receiving method of claim 1, wherein the step of determining the transmission format of the input signal according to the signal detecting result further comprises:

determining the transmission format of the input signal to be a first specific transmission format when the signal detecting result shows that the input signal is detected in the signal transmission channel; and determining the transmission format of the input signal to be a second specific transmission format when the signal detecting result shows that the input signal is not detected in the signal transmission channel.

7. The signal receiving method of claim 1, further comprising:

coupling an input impedance module to the signal transmission channel; and detecting whether there is an input signal, complying with a first specific transmission format, in the signal transmission channel.

8. The signal receiving method of claim 7, wherein the signal transmission channel is an auxiliary signal transmission channel.

9. The signal receiving method of claim 7, wherein the input impedance module complies with the first specific transmission format.

10. The signal receiving method of claim 7, further comprising:

determining the transmission format of the input signal to be a first specific transmission format when the signal detecting result shows that the input signal complying with the first specific transmission format is detected in the signal transmission channel; and determining the transmission format of the input signal to be a second specific transmission format when the signal detecting result shows that the input signal complying with the first specific transmission format is not detected in the signal transmission channel.

11. The signal receiving method of claim 1, wherein the step of determining the transmission format of the input signal according to the signal detecting result further comprises:

determining the transmission format of the input signal to be a Display Port interface transmission format when the input signal is not detected in at least one of the signal transmission channels.

12. The signal receiving method of claim 1, wherein the step of generating the signal detecting result corresponding to the signal transmission channel further comprises:

performing a signal processing operation on the input signal according to a first specific transmission format to generate the signal detecting result.

13. The signal receiving method of claim 12, wherein the step of determining the transmission format of the input signal according to the signal detecting result further comprises:

determining the transmission format of the input signal to be a second specific transmission format when the signal detecting result shows that a signal processing error occurs; and determining the transmission format of the input signal to be the first specific transmission format when the signal detecting result shows that the signal processing error does not occur.

14. The signal receiving method of claim 13, wherein the signal processing operation is a signal decoding operation, and the signal processing error is a signal decoding error.

15. The signal receiving method of claim 13, wherein the signal processing operation is a signal clock data recovery (CDR) operation, and the signal processing error is a signal CDR error.

16. The signal receiving method of claim 1, wherein the step of generating the signal detecting result corresponding to the signal transmission channel further comprises:

detecting signal maximum run length respectively transmitted by the input signal in the signal transmission channels to generate a plurality of signal maximum run length detecting results corresponding to the signal transmission channels.

17. The signal receiving method of claim 16, wherein the step of determining the transmission format of the input signal according to the signal maximum run length detecting results further comprises:
   determining the transmission format of the input signal to be a first specific transmission format when difference values between the signal maximum run length detecting results and a specific signal maximum run length are greater than a threshold value; and
   determining the transmission format of the input signal to be a second specific transmission format when the difference values between the signal maximum run length detecting results and the specific signal maximum run length are not greater than the threshold value.

18. The signal receiving method of claim 1, further comprising:
   turning off a switch module between the signal transmission channel and an input impedance module; and
   detecting whether there is an input signal.

19. The signal receiving method of claim 18, further comprising:
   determining the transmission format of the input signal to be a first specific transmission format when the signal detecting result shows that the input signal is detected; and
   determining the transmission format of the input signal to be a second specific transmission format when the signal detecting result shows that the input signal is not detected.

20. A signal receiving circuit for determining a transmission format of an input signal, the signal receiving circuit comprising:
   an input interface, including a set of common input terminals, a first set of specific input terminals, and a second set of specific input terminals, for receiving the input signal, wherein the first set of specific input terminals and the set of common input terminals are utilized for receiving the input signal corresponding to a specific transmission format, and the second set of specific input terminals and the set of common input terminals are utilized for receiving the input signal corresponding to another specific transmission format;
   a detecting module, coupled to the input interface, for generating a signal detecting result corresponding to at least a signal transmission channel of a plurality of signal transmission channels according to an output result of the signal transmission channel; and
   a determining unit, coupled to the detecting module, for determining the transmission format of the input signal according to the signal detecting result.

21. The signal receiving circuit of claim 20, wherein the detecting module further comprises:
   a signal frequency detecting unit, for detecting signal frequency respectively transmitted by the input signal in the signal transmission channels to generate a plurality of signal frequency detecting results corresponding to the signal transmission channels; and
   a signal frequency comparing unit, for comparing the signal frequency detecting results with each other to generate a signal frequency comparing result;
   wherein the determining unit is utilized for determining the transmission format of the input signal according to the signal frequency comparing result.

22. The signal receiving circuit of claim 20, wherein the detecting module further comprises a signal detecting unit.

23. The signal receiving circuit of claim 20, wherein the input interface further comprises:
   an input impedance module; and
   a switch module, coupled to the input impedance module, for selectively coupling the input impedance module to the signal transmission channel.

24. The signal receiving circuit of claim 23, wherein the detecting module further comprises:
   a signal detecting unit, for detecting whether there is an input signal, complying with a first specific transmission format, in the signal transmission channel.

25. The signal receiving circuit of claim 24, wherein the signal transmission channel is an auxiliary signal transmission channel.

26. The signal receiving circuit of claim 20, wherein the detecting module further comprises:
   a signal detecting unit, for detecting whether there is an input signal input from the input interface.

27. The signal receiving circuit of claim 20, further comprising:
   a signal processing module, coupled to the input interface and the detecting module, for performing a signal processing operation on the input signal according to a first specific transmission format to generate the signal detecting result.

28. The signal receiving circuit of claim 20, wherein the detecting module further comprises:
   a signal run length detecting unit, for detecting signal maximum run length respectively transmitted by the input signal in the signal transmission channels to generate a plurality of signal maximum run length detecting results corresponding to the signal transmission channels;
   wherein the determining unit is utilized for determining the transmission format of the input signal according to the signal maximum run length detecting result.

* * * * *